United States Patent
Bång (10) Patent No.: US 7,295,247 B2
(45) Date of Patent: Nov. 13, 2007

(54) SYNCHRONISATION OF AUDIO AND VIDEO SIGNALS

(75) Inventor: Goran Bång, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 599 days.

(21) Appl. No.: 10/344,490

(22) PCT Filed: Jun. 28, 2001
(Under 37 CFR 1.47)

(86) PCT No.: PCT/SE01/01492

§ 371 (c)(1),
(2), (4) Date: Dec. 16, 2003

(87) PCT Pub. No.: WO02/23916

PCT Pub. Date: Mar. 21, 2002

(65) Prior Publication Data

US 2004/0205214 A1    Oct. 14, 2004

(30) Foreign Application Priority Data

Sep. 14, 2000    (SE) .................................... 0003269

(51) Int. Cl.
*H04N 9/475* (2006.01)
(52) U.S. Cl. ...................... 348/515; 348/512
(58) Field of Classification Search ................ 348/512, 348/515, 518, 423.1; 375/240.28
See application file for complete search history.

(56) References Cited

U.S. PATENT DOCUMENTS

| | | | |
|---|---|---|---|
| 5,111,385 A | | 5/1992 | Hattori ........................ 395/425 |
| 5,287,182 A | * | 2/1994 | Haskell et al. .............. 348/500 |
| 5,543,853 A | * | 8/1996 | Haskell et al. ......... 375/240.28 |
| 5,594,660 A | * | 1/1997 | Sung et al. ............... 715/500.1 |
| 5,617,145 A | * | 4/1997 | Huang et al. ............. 348/423.1 |
| 6,049,769 A | | 4/2000 | Holmes et al. ............. 704/278 |
| 6,104,706 A | | 8/2000 | Richter et al. .............. 370/263 |
| 6,122,668 A | | 9/2000 | Teng et al. ................. 709/231 |
| 6,181,383 B1 | * | 1/2001 | Fox et al. .................... 348/515 |

FOREIGN PATENT DOCUMENTS

| | | |
|---|---|---|
| EP | 0 577 216 A1 | 1/1994 |
| EP | 0 598 295 A1 | 5/1994 |
| EP | 0 847 155 A2 | 6/1998 |
| JP | 57-182247 | 11/1982 |
| WO | WO 94/27233 A1 | 11/1994 |

* cited by examiner

Primary Examiner—Michael H. Lee (57) ABSTRACT

The present invention relates to adaptive time-shifting of audio frames ($F_a$) in encoded audio signal relative to video frames ($F_v$) in encoded video signal, which together form an audio/video message steam such that the corresponding decoded audio and video signals are aligned in time within the maximum degree of deviation. The invention accomplishes this alignment by determining a desired delay of the encoded audio signal for the decoded signals to meet deviation requirement The desired ($D_d$) delay is then converted into a frame delay number ($n_D$), which is calculated as one of the two neighbouring integers to a ratio between the desired delay ($D_d$) and an interval ($T_a$) at which the audio frames ($F_a$) are received. A number of audio frames ($F_a$) equal to the frame delay number ($n_D$) are alternately stored into respective read out from FIFO-buffers (309; 310) such that sufficiently delayed audio frames ($F_a$) are delivered to an audio decoding unit (313). After signal decoding (313; 315) synchronized audio and video information can thus be presented via a loudspeaker (314) and a video monitor (316) respectively.

15 Claims, 4 Drawing Sheets

SYNCHRONISATION OF AUDIO AND VIDEO SIGNALS

THE BACKGROUND OF THE INVENTION AND PRIOR ART

The present invention relates generally to the transmission of encoded audio and video information. More particularly the invention relates to adaptive time shifting of an encoded audio signal relative to an encoded video signal in a received audio/video message stream according to the preambles of claims 1 and 9. The invention also relates to a system for transmission of real-time audio and video information according to claim 14.

When audio and video information is presented jointly, i.e. moving images are shown together with a matching audio signal, a certain degree of synchronicity between the audio and the video information is demanded in order for the presentation to be acceptable by the human senses. For instance, a sound that can be deduced from the observation of a particular visual event must coincide sufficiently well in time with the presentation of such image information. Typically, the lip movements of a speaker must be at least relatively well synchronized with a playback of the speaker's voice. The human perception cannot, however, distinguish a very small deviation between an audio information and a corresponding visual event. Thus, if the deviation is small enough the audio information may either be presented slightly earlier or slightly later than the video information without this fact being noticeable by a human being. Experiments have shown that a one-way skew of less than 80 ms cannot be noticed and that a one-way skew of less than 150 ms is generally acceptable.

If, however, an audio signal and a corresponding video signal are presented with a deviation between the signals exceeding 400 ms the presentation is perceived to have an exceptionally low quality. Unfortunately, the video delay in most of today's videoconference systems running at the ISDN basic rate of 128 kpbs is in the order of 400 ms (ISDN=Integrated Services Digital Network).

In GSM the audio delay is approximately 90 ms. (GSM=Global System for Mobile communication). In a solution where a voice signal is transmitted via GSM and a corresponding video signal is sent by means of a 128 kpbs video conferencing system a delay between 230 ms and 390 ms must be added to the audio signal in order to maintain a deviation of 80 ms or less between the audio and the video signal. Since the audio signal is sampled and converted into a digitally encoded signal, which is delivered in encoded audio frames at typically 20 ms intervals, the clock signal generating the delay of the audio signal must have a very high accuracy.

The patent document EP, A1, 0 577 216 describes an audio/video-interface in which a FIFO (First In/First Out) buffer is used to accomplish a constant delay of received data such that a presented voice signal is synchronized with related lip movements of a speaker. The fullness of the FIFO buffer is controlled in response to a buffer centering signal, which defines a range between an upper and a lower threshold value corresponding to a desired delay interval. If the buffer fullness falls below the lower threshold value the same data elements are repeatedly read out until a sufficient delay of the data is achieved. If, however, the buffer fullness increases above the upper threshold level new data elements are instead written over previously stored data elements until the delay is reduced to the desired level.

An alternative method and arrangement for maintaining a constant delay between a received audio signal and a received video signal is described in EP, A1, 0 598 295. Here samples of the audio signal are temporarily stored in a buffer memory to achieve a certain delay of the signal. The number of stored audio samples in the buffer memory is detected in every n:th field of the video signal. If this number reaches a specified value the read or write address of the buffer memory is preset such that the number of stored audio samples at the inspection point occurring at intervals of n video fields is kept constant.

The U.S. Pat. No. 6,104,706 discloses a solution where audio, video and possibly other kinds of data are time multiplexed into a packetized data stream in which each packet is assigned a particular priority. The packetized data stream is then transmitted in substantially the order of priority. Audio packets are given a highest priority followed by video packets. Packets containing other types of data are given the lowest priority. Continuous real time audio playback is maintained at the receiver side by delaying the playback of received audio packets in a FIFO-buffer, which provides a delay time equal to a predicted average system delay for the communications system. The audio playback is slowed or accelerated in order to shrink or grow the difference in time between the sender and the receiver.

The patent document EP, A1, 0 577 216 describes a semiautomatic system for accomplishing synchronicity between lip movements of a speaker and corresponding voice information by means of a programmable delay circuit in the audio channel. An area of the image represented by the video channel is manually defined within which motion related to sound occurs. Motion vectors are then generated for the defined area, and correlated with levels of the audio channel to determine a time difference between the video and the audio channels. The programmable delay circuit is controlled to compensate for this delay such that the voice signal can be presented in parallel with the relevant video information.

All the above-mentioned documents refer to various delays of an audio signal. It is, however, very difficult to obtain a perceptually satisfying result when applying the known solutions, if the delay is implemented by means of a system resource in a computer. In practice, computers having non-real-time operative systems namely cannot maintain a sufficient accuracy of an allocated system resource such that a delayed audio signal can be aligned in time with a video signal within a degree of deviation that can be accepted by the human perception. Naturally, it is no less possible in such a computer to decrease the deviation between such signals below what is noticeable by the human senses.

SUMMARY OF THE INVENTION

The object of the present invention is thus to alleviate the problems above by providing a delay of a received audio signal relative to a received video signal, which is stable enough to maintain a desired alignment in time between the respective signals.

According to a first aspect of the invention the object is achieved by a method of adaptively time-shifting an encoded audio signal relative to an encoded video signal in a received audio/video message stream as initially described, which is characterised by first calculating a frame delay number as one of the two neighbouring integers to a ratio between a desired delay of the encoded audio signal and frame interval of the encoded audio signal. Then, a number of audio frames equal to the frame delay number are stored sequentially before decoding a matching video frame. After that, the matching video frame is decoded and the stored audio frames are decoded in their sequential order of storage. These steps are repeated for any remaining audio frames and video frames of the message stream until the stream ends.

According to a second aspect of the invention the object is achieved by a computer program directly loadable into the Internal memory of a computer, comprising software for performing the method of the first aspect of the invention when said program is run on a computer.

According to a third aspect of the invention the object is achieved by a computer readable medium, having a program recorded thereon, where the program is to make a computer perform the method of the first aspect of the invention.

According to a fourth aspect of the invention the object is achieved by an apparatus for adaptively time-shifting an encoded audio signal relative to an encoded video signal in a received audio/video message stream as initially described, which is characterised in that it comprises a first and a second buffer, both for sequentially storing received audio frames, and a controller. Depending on the applicable system specification and/or transmission protocol under which the apparatus operates audio frames are generated by a transmitter at a specific rate. The controller internally stores information pertaining to this parameter in the form of a first frame interval value representing a time span between two consecutive audio frames. The controller derives and stores a desired delay value from timing indications of the received audio frames and the received video frames. The desired delay value indicates a necessary delay of the audio frames for the decoded audio and video signals to be aligned in time within the maximum degree of deviation. The controller calculates a frame delay number as one of the two neighbouring integers to a ratio between the desired delay value, and the first frame interval value. Furthermore, the controller controls an alternate storage of delay number audio frames into the first buffer during read-out of delay number audio frames from the second buffer respective storage of delay number audio frames into the second buffer during read-out of delay number audio frames from the first buffer such that audio frames having been delayed a time equal to the delay number times the audio frame interval are read out from the buffers.

According to a fifth aspect of the invention the object is achieved by a system for transmission of real-time audio and video information from a transmitter station to a receiver station, via a transmission medium. The transmitter station comprises an audio encoding unit, which encodes audio information into audio frames, a video encoding unit, which encodes video information into video frames and a multiplexer, which combines the audio frames and the video frames to an audio/video message stream. This message stream is then sent through the transmission medium to the receiver station. Primarily, the receiver station comprises an apparatus according to the fourth aspect of the invention. It also comprises an audio decoding unit, which extracts an audio signal from received audio frames and a video decoding unit, which extracts a video signal from received video frames.

The proposed adaptive time-shifting of an encoded audio signal relative to an encoded video signal in a received audio/video message stream is very accurate and thereby ensures that the deviation between the decoded audio signal and the decoded video signal never exceeds the duration of one audio frame interval. Since these intervals always are very short it is possible to provide an alignment in time of the audio and the video signals, which is acceptable by the human senses. In most cases, it will not even be possible for a human being to distinguish any shift at all between the audio and the video signals.

The solution according to the invention is also comparatively simple to implement and requires relatively low processing power. Moreover, the central processor of a computer on which the process runs will not be blocked during the delay interval.

Finally, the invention makes it easy to adaptively adjust the delay value in running mode in case the situation so demands.

BRIEF DESCRIPTION OF THE DRAWINGS AND THE ANNEX

The present invention is now to be explained more closely by means of preferred embodiments, which are disclosed as examples, and with reference to the attached drawings and annex.

DESCRIPTION OF PREFERRED EMBODIMENTS OF THE INVENTION

Figure 1A:
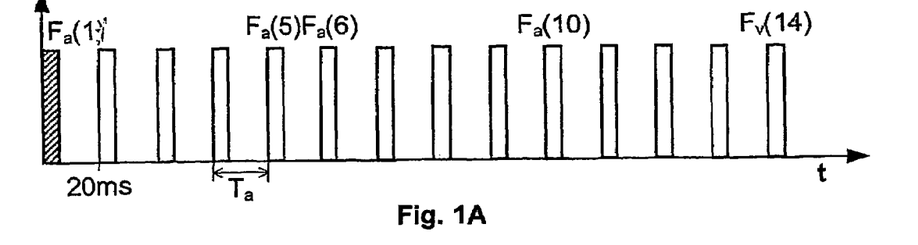
FIGS. 1A-1D demonstrate by means of timelines how audio frames are delayed relative to matching video frames according to the invention.

FIG. 1A shows a timeline in which audio frames $F_a(1)$-$F_a(14)$ containing encoded audio information are transmitted at a first frame interval $T_a$=20 ms. A first audio frame $F_a(1)$ is thus sent at t=0, followed by another audio frame 20 ms later and so on.

Figure 1B:
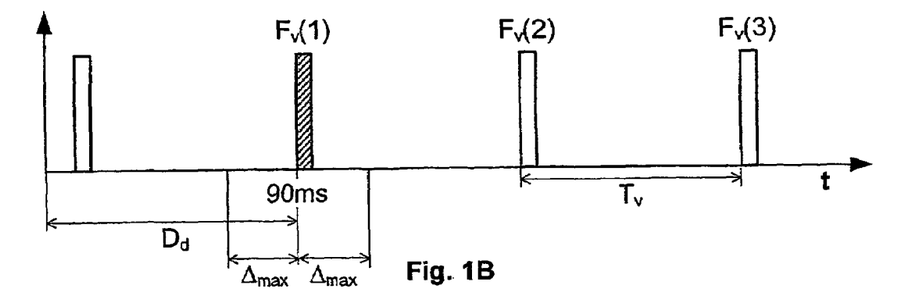

FIG. 1B shows a timeline of video frames $F_v(1)$-$F_v(3)$ containing encoded video information corresponding to the audio information contained in the audio frames $F_a(1)$-$F_a(14)$ in FIG. 1A. The video frames $F_v(1)$-$F_v(3)$ are transmitted at a second frame interval $T_v$, which typically is longer than the first frame interval $T_a$. Even though this is true for most implementations, a reverse relationship is, at least theoretically, also conceivable.

In this example a first video frame $F_v(1)$ arrives at a receiver 90 ms later than the first audio frame $F_a(1)$. Presuming that the decoding time for an audio frame is equal to the decoding time for a video frame, the received audio frames $F_a(^1)$-$F_a(^{14})$ should thus be delayed 90 ms in order to align the decoded audio signal in time with the decoded video signal. The desired delay $D_d$ of the received audio frames $F_a(1)$-$F_a(14)$ is consequently 90 ms. However, the human perception cannot distinguish a deviation between the audio and the video information if such deviation is less than certain value $\Delta_{max}$, of say 80 ms. Therefore, a degree of deviation between the audio signal and the video signal is acceptable if it falls within maximum value $\Delta_{max}$ of the desired delay $D_d$.

The audio frames $F_a(1)$-$F_a(14)$ shall be delayed to arrive at an audio decoder $D_d \pm \Delta_{max}$ after reception of the respective frames $F_a(1)$-$F_a(14)$. Provided that the first frame interval $T_a$ is less than $\Delta_{max}$ it is sufficient if an actual delay of the audio frames falls within one first frame interval $T_a$ of the desired delay $D_d$. This is indeed a safe assumption, since a common value for first frame interval $T_a$ is in the order of 20-30 ms for the audio encoding systems used today.

According to the present invention the delay of the audio frames $F_a(1)$-$F_a(14)$ is expressed in an integer number of audio frame intervals. More precisely, a frame delay number $n_D$ is calculated as one of the two neighbouring integers to a ratio between the desired delay $D_d$ and the first frame interval $T_a$. This can also be expressed mathematically as:

$$n'_D = \left[\frac{D_d}{T_a}\right] \text{ or} \tag{1}$$

$$n''_D = \left[\frac{D_d}{T_a}\right] + 1 \tag{2}$$

Figure 1C:
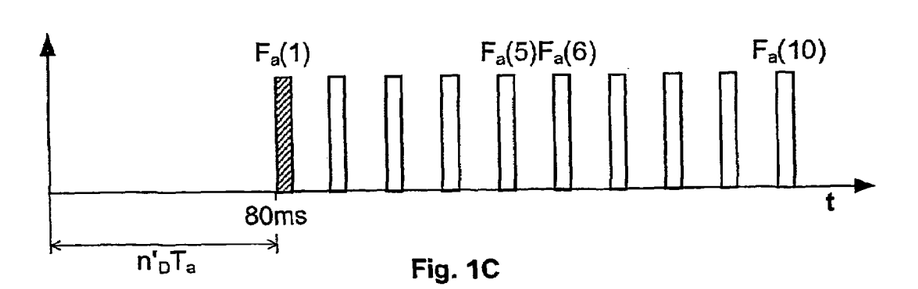

FIG. 1C shows a timeline in which the audio frames $F_a(1)$-$F_a(14)$ of FIG. 1A have been delayed a first time $n'_D T_a$ corresponding to a first delay number $n'_D$ times the first frame interval calculated according to the expression (1) above. Thus, $n'_D$=int(90/20)=4 and the first delay time $n'_D T_a$=4×20 ms=80 ms.

Figure 1D:
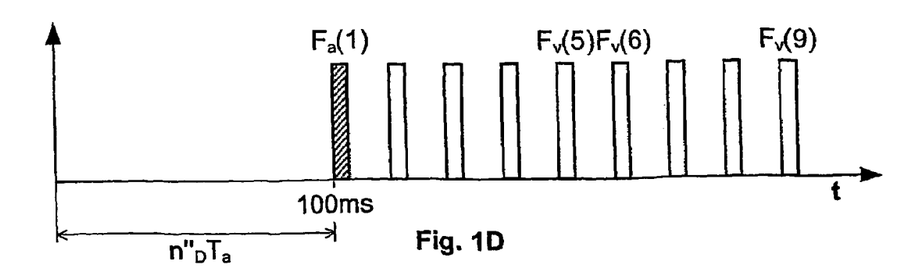

FIG. 1D shows a timeline in which the audio frames $F_a(1)$-$F_a(14)$ of FIG. 1A instead have been delayed a second time $n''_D T_a$ corresponding to a second delay number $n''_D$ times the first frame interval calculated according to the expression (2). Hence, $n''_D$=int(90/20)+1=5 and the second delay time $n''_D T_a$=5×20 ms=100 ms.

Both the first delay time $n'_D T_a$ and the second delay time $n''_D T_a$ result in a deviation (10 ms) from the desired delay $D_d$=90 ms, which lies well within the maximum value $\Delta_{max}$ (around 80 ms). In fact, the proposed solution ensures a maximum deviation $\Delta_{max}$ of a time period equal to the first frame interval $T_a$=20 ms. This is a value far below what can be distinguish by the human perception.

Figure 2:
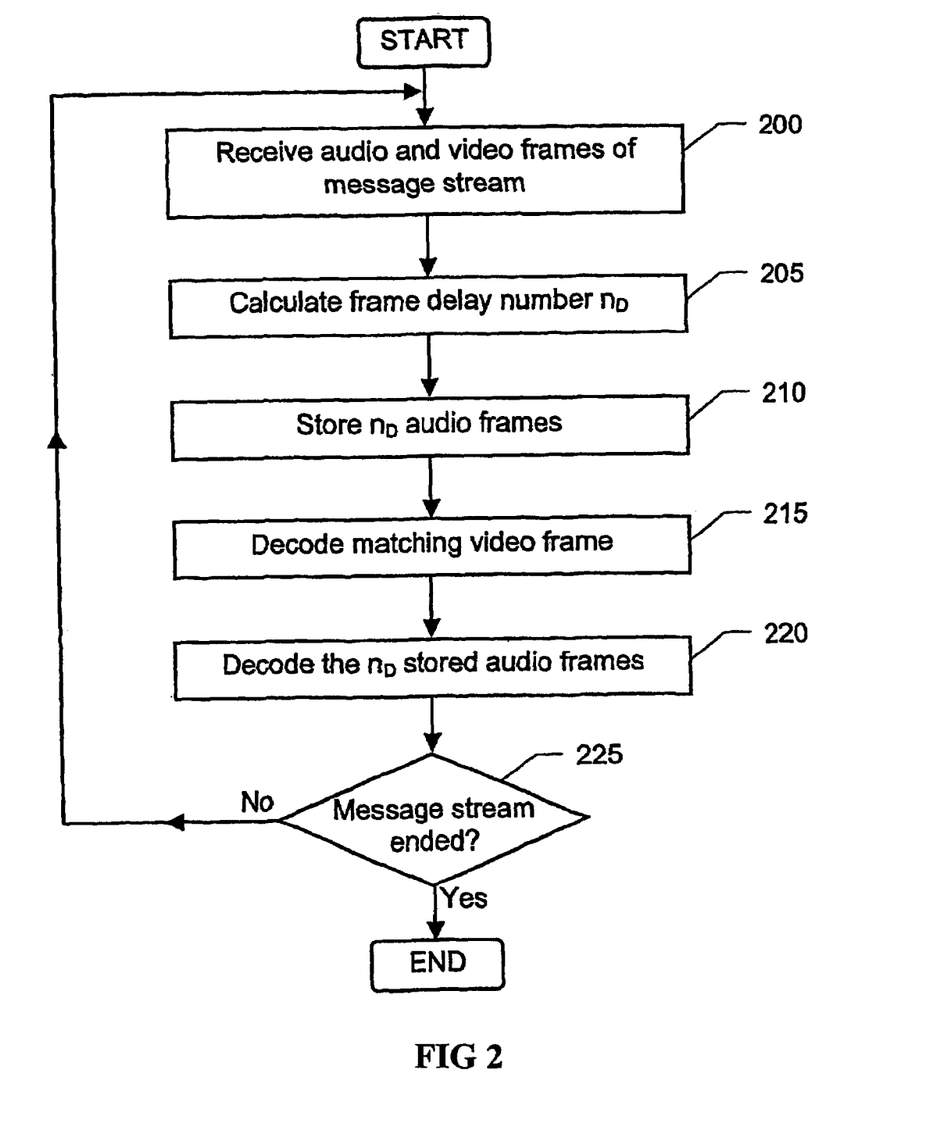
FIG. 2 illustrates the general method according to the invention in a flow diagram.

The method exemplified with reference to FIGS. 1A-1D is illustrated generally in FIG. 2 by means of a flow diagram. Audio frames and video frames constituting an audio/video message stream are received in a first step 200. A following step 205 extracts timing information from the frames received in the previous step 200. The audio and the video frames are presumed to be transmitted under a transport protocol, which provides support for timing reconstruction, such as the Real-time Transport Protocol (RTP). This protocol allocates a timestamp to each frame indicative of a point in time when the particular frame was created. By studying the timestamps it is thus possible to determine which audio respective video frames that should be presented together in order to achieve a time alignment of the corresponding signals. Typically, the timestamps of the frames in the received audio/video message stream specify to what extent it is desirable to delay the received audio frames relative to the received video frames. The desired delay is then converted into a corresponding frame delay number $n_D$ according to the equations (1) and (2) described with reference to FIGS. 1C and 1D above. In RTP the timestamp includes 32 bits and the initial value is randomly set. The difference between a timestamp value and this initial value thus indicates a timing position (or age) of a particular frame. Of course, any other way to uniquely indicate timing information for the frames is equally applicable under the method according to the present invention.

A next step 210 stores a number of received audio frames equal to the frame delay number $n_D$ before a matching video frame is decoded. A subsequent step 215 then decodes the matching video frame, i.e. a video frame whose timestamp approximately corresponds to the timestamps of the $n_D$ stored audio frames. In practice, this means that the audio frames may have timestamps with slightly higher and/or lower values than the video frame. A following step 220 then decodes the $n_D$ stored audio frames. Finally, a step 225 interrogates whether the audio/video message stream has ended, and if so, the procedure also ends. Otherwise the procedure is looped back to the first step 200.

Figure 3:
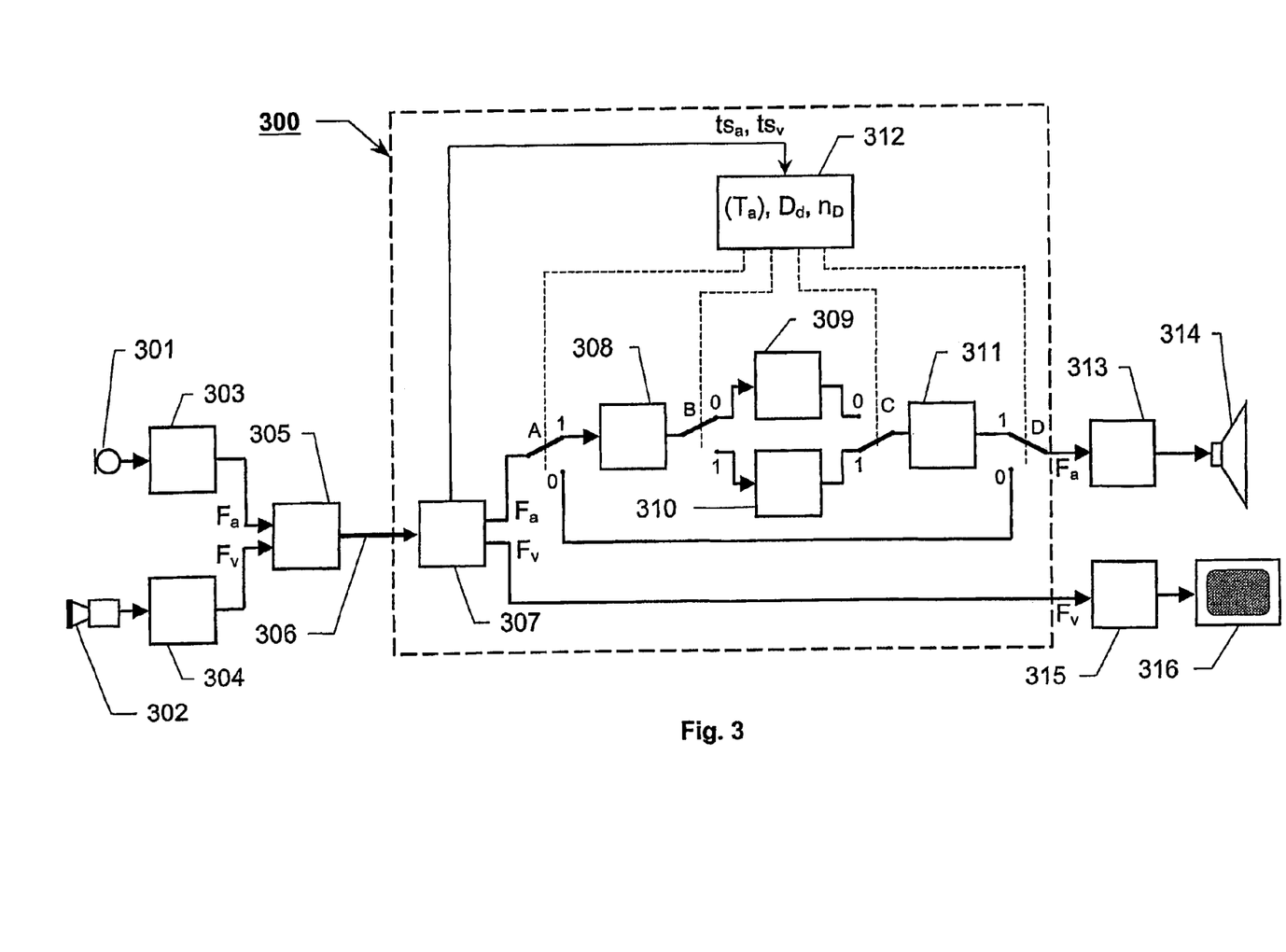
FIG. 3 shows a block diagram over an embodiment of an apparatus and a system according to the invention.

FIG. 3 shows a block diagram over an embodiment of an apparatus 300 and a system according to the invention. The system includes a transmitter station, a transmission medium and a receiver station. The receiver station in turn includes an apparatus, which provides adaptive time-shifting of an encoded audio signal relative to an encoded video signal in a received audio/video message stream such that a corresponding decoded audio signal respective decoded video signal are aligned in time within a maximum degree of deviation.

Acoustic and moving image information is generated at the transmitter station and recorded by a microphone 301 respective a video camera 302. An audio signal modelling the acoustic information is transferred from the microphone 301 to an audio encoding unit 303, which samples the signal, converts the samples into a digitally encoded format and forms audio frames $F_a$ that are delivered to a multiplexer 305 at a first frame interval. Correspondingly, a video signal representing the moving image information is transferred from the video camera 302 to a video encoding unit 304, which samples the signal, converts the samples into a digitally encoded format and forms video frames $F_v$ that are delivered to the multiplexer 305 at a second frame interval.

The multiplexer 305 combines the audio frames $F_a$ and the video frames $F_v$ to an audio/video message stream, which is transmitted through the transmission medium 306 to the receiver station. The transmission medium 306 is typically constituted by transmission resources allocated on the Internet. However, the transmission medium 306 can be an arbitrary transmission resource with adequate bandwidth and delay properties set up in any communication environment, fixed or mobile.

An apparatus 300 in the receiver station collects the audio/video message stream in a de-multiplexer 307, which separates the stream into audio frames $F_a$ respective video frames $F_v$. Furthermore, the de-multiplexer 307 arranges the incoming audio frames $F_a$ and video frames $F_v$ in a chronological order. This can, for instance, be performed on basis of a frame sequence number, which is allocated to each frame on the transmitter side at generation of the respective frame. The de-multiplexer 307 also extracts timing information $ts_a$, $ts_v$ from the received frames $F_a$, $F_v$ and sends this information to a controller 312. Moreover, the controller 312 internally stores a value, which represents the interval $T_a$ between two consecutive audio frames $F_a$ generated by the audio encoding unit 303. On basis of the timing information $ts_a$, $ts_v$ related to the received frames $F_a$, $F_v$ respective the interval $T_a$ the controller 312 calculates a desired delay value $D_d$ and a corresponding delay number $n_D$ according to the method described earlier. The value of the delay number $n_D$ determines how the controller 312 controls switches A, B, C respective D and other units in the apparatus 300 such that the method according to this embodiment of the invention is accomplished. This will be described in detail below and with further reference to FIG. 4.

The audio frames $F_a$ are forwarded to an input data forming unit 308 via a first delay switch A. When this switch A is placed in a first position 1 audio frames $F_a$ may pass through it to the input data forming unit 308 where the incoming audio frames $F_a$ are arranged according to a data structure, which is suitable for sequential storage in a delay buffer. This could, for instance, involve translation of a first set of variables into a second set of variables describing the data size and/or structure of the audio frames $F_a$. However, when the first delay switch A is placed in a second position 0 incoming audio frames $F_a$ are passed without additional delay to a second delay switch D (placed in a second position 0) after which the audio frames $F_a$ arrive at an audio decoding unit 313. The first delay switch A and the second delay switch D are both controlled by the controller 312 and are placed in their respective second positions 0 when the calculated delay number $n_D$ equals zero.

Nevertheless, if the delay number $n_D$ is calculated to have a value larger than zero, the controller 312 places the first delay switch A and the second delay switch D in their respective first positions 1. This results in incoming audio frames $F_a$ being fed through the input data forming unit 308 to a first buffer switch B, which initially is placed in a second position 0, such that the audio frames $F_a$ are sequentially fed into a first buffer 309 of FIFO-type (FIFO=First In/First Out). Simultaneously, previously stored audio frames $F_a$ (if such exist) are sequentially read out from a second buffer 310, also of FIFO-type, via an output data delivery unit 311 to the audio decoding unit 313. The output data delivery unit 311 re-arranges the audio frames $F_a$ according to a data structure, which is suitable for decoding. This could, for instance, involve translation of the second set of variables back into the first set of variables describing the data size and/or structure of the audio frames $F_a$. In the beginning of a new audio/video message stream the second buffer 310 is empty, which means that during this initial phase a zero signal, i.e. empty audio frames $F_a$, are fed out from the second buffer 310.

When a number of audio frames $F_a$ equal to the delay number $n_D$ have been stored in the first buffer 309 the controller 312 places the first buffer switch B in its first position 1. In parallel with this, a second buffer switch C is placed in a second position 0. The audio frames $F_a$ are now instead sequentially fed into the second buffer 310. At the same time the audio frames $F_a$ that were stored in the first buffer 309 during the previous delay interval are read out from this buffer 309. After another delay number $n_D$ of audio frames $F_a$ the controller 312 again changes positions of the buffer switches B and C. The effect of this alternating storage into respective read-out from the first buffer 309 and the second buffer 310 is that audio frames $F_a$ are fed into the audio decoding unit 313 with a delay corresponding to the delay number $n_D$ times the frame rate interval $T_a$.

The controller 312 continuously registers timing information $ts_a$, $ts_v$ of the received audio frames $F_a$ and video frames $F_v$ and calculates updated delay numbers $n_D$ on basis thereof. Should a delay number $n_D$ be calculated, which is larger than its present value longer sequences of audio frames $F_a$ will be stored in the buffers 309; 310, and should instead a delay number $n_D$ be calculated, which is smaller than its present value shorter sequences of audio frames $F_a$ will be stored in the buffers 309; 310.

In the latter case, a number of audio frames $F_a$ equal to the decrease in the delay number $n_D$ must be discarded. This can be effectuated by performing a sufficient number of dummy read-outs from a relevant buffer and discarding the corresponding audio frames $F_a$. Naturally, such discarding can be executed momentarily from one delay interval to another. However, if the delay number $n_D$ value is to be decreased by more than one a gradual transition from the higher to the lower value results in a perceptually improved output signal.

FIG. 3 shows the buffers 309 and 310 as being two separate units. Naturally, this does neither exclude that the buffers are included in one and the same memory circuit nor is excluded that the buffers constitute separated parts the same memory area.

Thus, the controller 312 controls the switches A, B, C and D in the apparatus 300 such that the audio frames $F_a$ being fed into the audio decoding unit 313 and the video frames $F_v$ being fed into the video decoding unit 315 are aligned in time with a maximum skew of a time equal to the first frame interval $T_a$. As a consequence thereof the corresponding decoded audio signal and the corresponding decoded video signal are presented to an operator via a loudspeaker 314 respective a video monitor 316 with an alignment in time that lies within the maximum degree of deviation (and what can be distinguished by the human senses).

In case decoding a video frame $F_v$ takes longer time than decoding an audio frame $F_a$, or vice versa, the desired delay value $D_d$ is adjusted to compensate for the fact, such that the decoded audio signal and the decoded video signals still are aligned in time within the maximum degree of deviation.

Figure 4:
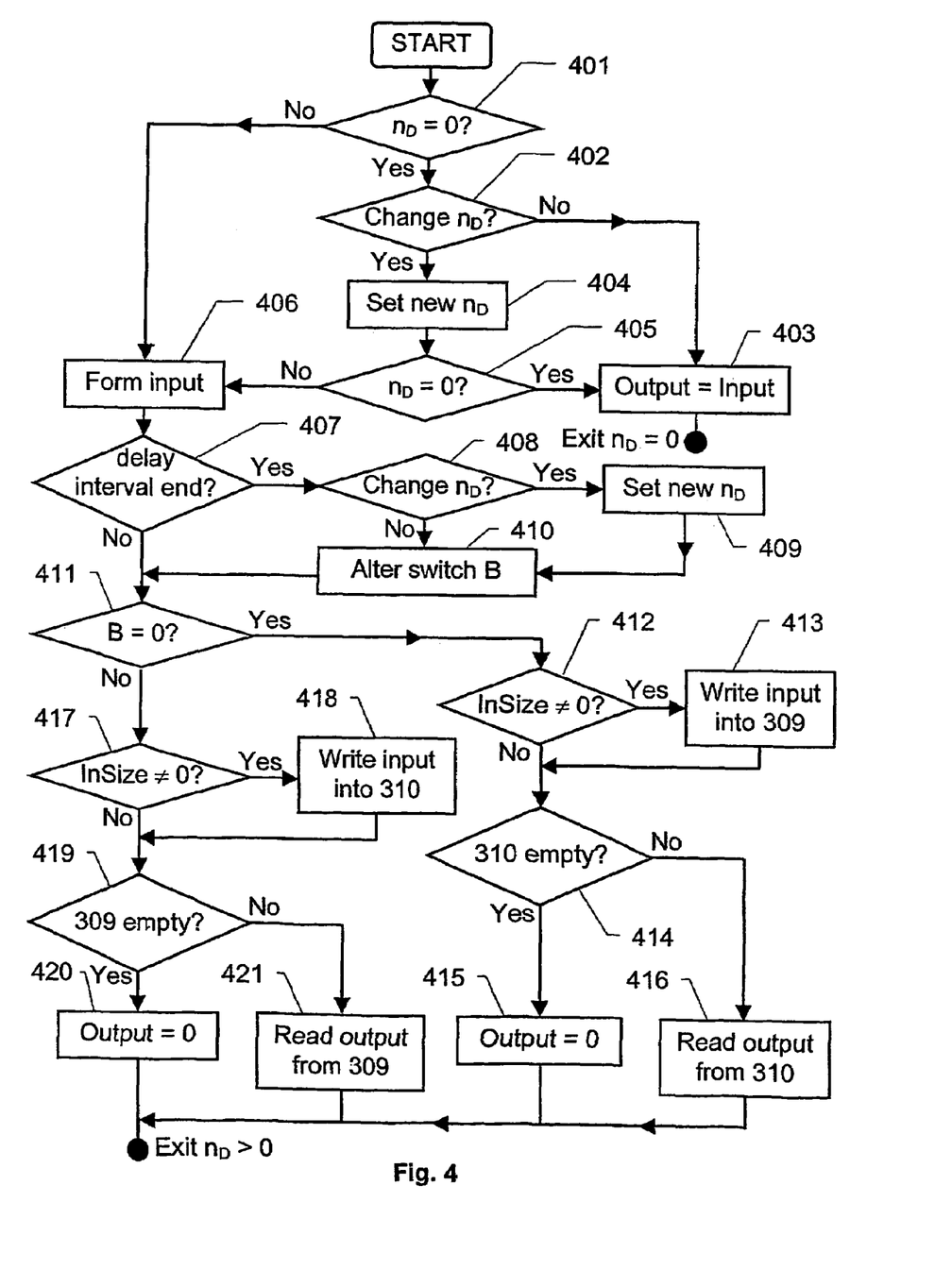
FIG. 4 illustrates an embodiment of the method according to the invention in a flow diagram, and Annex 1 includes a listing of a computer program for performing the method according to an embodiment of the invention.

FIG. 4 illustrates, in a flow diagram, an embodiment of the method according to the invention, which is controlled by the controller 312 in FIG. 3. At each frame interval the procedure starts in a first step 401 inquiring whether the present delay number $n_D$ is equal to zero. In case this question is answered in the affirmative a following step 402 then inquires whether the delay number $n_D$ should be changed. If the delay number $n_D$ should be maintained at zero value, the procedure continues with a step 403 that sets the output signal equal to the input signal (meaning that incoming audio frames $F_a$ are passed directly from the de-multiplexer 307, via the first delay switch A, to the second delay switch D in FIG. 3). After that, the procedure exits with a delay number $n_D$ equal to zero and returns to the first step 401.

In case the question posed in step 402 is answered in the affirmative the delay number $n_D$ is updated to a new value in a subsequent step 404. A following step 405 again queries if the delay number $n_D$ is zero, and if so (however unlikely) the procedure continues to the step 403. Otherwise, input data is formed in a step 406. This means that incoming audio frames $F_a$ are arranged in chronological order (in the input data forming unit 308). Thereafter, a step 407 investigates whether the delay interval has ended, i.e. whether a point in time has been reached at which a change of the delay number $n_D$ value can take place. If the question posed in the step 407 is answered in the affirmative a step 408 inquires if the delay number $n_D$ value actually should be changed, and if so, the parameter is allocated a new value in a following step 409, and the first buffer switch B alters its position in a subsequent step 410. Otherwise, the procedure continues directly from the step 408 to the step 410, where the first buffer switch B is altered, so that incoming audio frames $F_a$ are fed into a different buffer (i.e. 309 or 310) than in the previous delay interval.

A following step 411 investigates the current position of the first buffer switch B, and if this switch B is found to be positioned in its second position 0 the procedure continues to a step 412. This step queries whether the size of the incoming audio frames $F_a$ is equal to zero, i.e. whether there exists data to be stored into a buffer. Provided that such data exists a following step 413 writes the data into the first buffer 309 (i.e. audio frames $F_a$ are sequentially stored in the first buffer 309). If, however, the step 412 finds that the size of the incoming audio frames $F_a$ is equal to zero (i.e. there is no data to store in the first buffer 309), a following step 414 queries whether the second buffer 310 is empty, and if so, an output signal delivered to the output data delivery unit 311 is set to zero in a subsequent step 415. Otherwise, a step 416 reads out the data (i.e. stored audio frames $F_a$) from the second buffer 310 via the second buffer switch C to the output data delivery unit 311.

If the step 411 finds that the first buffer switch B is positioned in its first position 1 the procedure instead continues to a step 417, which inquires whether the size of the incoming audio frames $F_a$ is equal to zero (i.e. if there is incoming data). Provided that non-empty audio frames $F_a$ are received, a following step 418 writes that data into the second buffer 310 (i.e. audio frames $F_a$ are sequentially stored in the second buffer 310) and the procedure continues to a step 419. If, however, the step 417 finds that the size of the incoming audio frames $F_a$ is equal to zero (i.e. there is no data to store in the second buffer 310), the procedure continues directly to the step 419. This step queries whether the first buffer 309 is empty, and if so, the output signal delivered to the output data delivery unit 311 is set to zero in a subsequent step 420. Otherwise, a step 421 reads out the data (i.e. stored audio frames $F_a$) from the first buffer 309 via the second buffer switch C to the output data delivery unit 311. Then, the procedure exits with a delay number $n_D$ larger than zero and returns to the first step 401.

A listing of a computer program for performing the method according to an embodiment of the invention is attached as an annex 1.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

```
/******************************************************************
* The copyright to the document(s) herein is the property of
* Ericsson Radio Systems AB, Sweden.
*
* The document(s) may be used and/or copied only with the written
* permission from Ericsson Radio Systems AB or in accordance with
* the terms and conditions stipulated in the agreement/contract
* under which the document(s) have been supplied.
******************************************************************
* Author: KI/ERA/T/VV Goran Bang
* Date: 2000-05-12
* Name: Declaration of delayqueue.h
* Description:
* DelayQueue is an efficient implementation of a delay unit that
* uses the call intervals of the audioFrameInterval (20 or 30 ms) as
* a time base for all processing. Hence no extra system timer is used.
* Simultaneously as an input is written into the delay unit an output
* is read. The calling function returns imediately and does not
* block the CPU during the delay time. The class is made generic
* and is implemented as a template class, allowing the delay of any
* type of data. For the sake of efficiency the class is inline
* implemented.
*
* Constructor:
*    DelayQueue( int audioFrameInterval, int delay );
*        audioFrameInterval must be implemented and given i ms
*        delay is given in ms and can be any positve integer, default=0
* Destructor:
*    ~DelayQueue( );
*        Nothing on the the heap and no system resources, so the destructor
*        is empty.
* Member methods:
*    void DelayData (const std::vector<T>const& vIn, const int inSize,
*                    std::vector<T>&           vOut, int&  outSize);
*        vIn is a vector containing the input data of size inSize
*        vOut is a vector containing the output data of size outSize
*        If data is not yet available at the output, outSize = 0.
*    void DelayData (const T* const pIn, const int inSize,
*                    T*             pOut, int&  outSize );
*        The same as previous method but implemented with pointers
*        instead of vectors.
*    bool IsEmpty( ) const;
*        returns true if the delay unit is empty.
*    void ChangeDelay( int newDelay);
*        newDelay >= 0 given in ms.
*    int GetDelay( ) const;
*        returns the current delay in ms.
*
******************************************************************/
```

-continued

```
#ifndef DELAYQUEUE_H
#define DELAYQUEUE_H
#include <iostream>
#include <queue>
#include "datastruct.h"
template <class T>
class DelayQueue
{
public:
    DelayQueue       ( int audioFrameInterval,    // ms
                       int delay        = 0);     // ms
    ~DelayQueue      ( ) {}
    void DelayData   ( const std::vector<T>const&   vIn, const int inSize,
                       std::vector<T>&              vOut, int&   outSize);
    void DelayData   ( const T* const    pIn, const int inSize,
                       T*                pOut, int&   outSize   );
    bool IsEmpty     ( ) const;
    void ChangeDelay ( int delay );               // ms
    int  GetDelay    ( ) const;
private:
    DelayQueue       ( const DelayQueue& copy);
    DelayQueue& operator = (const DelayQueue<T>& assign );
    void DecreaseDelay( );
    DataStruct<T>              in_;
    DataStruct<T>              out_;
    std::queue< DataStruct<T> > fifo_[2];     // notice space ...< Dat...<T> >
    int                        audioFrameInterval_;
    int                        delay_;
    int                        Count_;
    int                        newDelay_;
    bool                       theOtherFifo_;
    bool                       changeDelay_;
    int                        delayInterval_;
};
//================================================================
template <class T>
DelayQueue<T>::DelayQueue( int audioFrameInterval, int delay )
    : audioFrameInterval_(audioFrameInterval), delay_(delay),
      count_(0), newDelay_(0), theOtherFifo_(true), changeDelay_(false)
{
    delayInterval_= delay_? delay_/audioFrameInterval_+ 1 : 0;
}
template <class T>
inline
void
DelayQueue<T>::ChangeDelay( int delay )
{
    newDelay_    = delay;
    changeDelay_ = true;
}
template <class T>
inline
void
DelayQueue<T>::DelayData(  const std::vector<T>const&   vIn, const int inSize,
                           std::vector<T>&              vOut, int&   outSize)
{
    if( delayInterval_== 0 ) {
        if( changeDelay_) {
            changeDelay_     = false;
            delay_           = newDelay_;
            delayInterval_   = delay_? delay_/audioFrameInterval_+ 1 : 0;
            if( delayInterval_== 0 ) {
                vOut = vIn;
                outSize = inSize;
                return;
            }
            //std::cout << "*************** Flag_= true\n";
        }
        else {
            vOut = vIn;
            outSize = inSize;
            return;
        }
    }
    in_= DataStruct<T>( vIn, inSize );
    if( count_++ % delayInterval_== 0 ) {
        if( changeDelay_) {
            changeDelay_= false;
            if( newDelay_< delay_) {
```

```
            DecreaseDelay( );
         }
         delay__           = newDelay__;
         delayInterval__   = delay__? delay__/audioFrameInterval__+ 1 : 0;
         count__           = 1;
         //std::cout << "**************** Flag__= true\n";
      }
      theOtherFifo__       = !theOtherFifo__;
   }
   if( theOtherFifo__) {
      if( inSize != 0 ) {
         fifo__[0].push(in__);      // write
      }
      if( !fifo__[1].empty( ) ) {   // read
         Out__= fifo__[1].front( );
         fifo__[1].pop( );
         outSize = out__.Size( );
         vOut = out__.vData__;
      }
      else {
         vOut.clear( );
         outSize = 0;
      }
   }
   else {
      if( inSize != 0 ) {
         fifo__[1].push(in__);      // write
      }
      if( !fifo__[0].empty( ) ) {   // read
         out__= fifo__[0].front( );
         fifo__[0].pop( );
         outSize = out__.Size( );
         vOut = out__.vData__;
      }
      else {
         vOut.clear( );
         outSize = 0;
      }
   }
}
template <class T>
inline
void
DelayQueue<T>::DelayData(   const T* const pIn, const int inSize,
                            T* pOut, int&     outSize )
{
   if( delayInterval__== 0 ) {
      if( changeDelay__) {
         changeDelay__     = false;
         delay__           = newDelay__;
         delayInterval__   = delay__? delay__/audioFrameInterval__+ 1 : 0;
         if( delayInterval__== 0 ) {
            for( int i=0; i<inSize; ++i ) {
               pOut[i] = pIn[i];
            }
            outSize = inSize;
            return;
         }
         //std::cout << "**************** Flag__= true\n";
      }
      else {
         for( int i=0; i<inSize; ++i ) {
            pOut[i] = pIn[i];
         }
         outSize = inSize;
         return;
      }
   }
   in__= Datastruct<T>( pIn, inSize );
   if( count__++ % delayInterval__== 0 ) {
      if( changeDelay__) {
         changeDelay__= false;
         if( newDelay__< delay__) {
            DecreaseDelay( );
         }
         delay__           = newDelay__;
         delayInterval__   = delay__? delay__/audioFrameInterval__+ 1 : 0;
         count__           = 1;
         //std::cout << "**************** Flag__= true\n";
```

```
            }
            theOtherFifo__     = !theOtherFifo__;
        }
        if( theOtherFifo__ ) {
            //std::cout << "theOtherQueue =              true\n";
            if( inSize != 0 ) {
                fifo__[0].push(in__);     // write
            }
            if( !fifo__[1].empty( ) ) {  // read
                out__= fifo__[1].front( );
                fifo__[1].pop( );
                outSize = out__.Size( );
                for( int i=0; i<outSize; ++i ) {
                    pOut[i] = out__.vData__[i];
                }
            }
            else {
                pOut = static_cast<T*>(0);
                outSize = 0;
            }
        }
        else {
            //std::cout << "theOtherQueue =           false\n";
            if( inSize != 0 ) {
                fifo__[1].push(in__);     // write
            }
            if( !fifo__[0].empty( ) ) {  // read
                out__= fifo__[0].front( );
                fifo__[0].pop( );
                outSize = out__.Size( );
                for( int i=0; i<outSize; ++i ) {
                    pOut[i] = out__.vData__[i];
                }
            }
            else {
                pOut = static_cast<T*>(0);
                outSize = 0;
            }
        }
    }
}
template <class T>
inline
bool
DelayQueue<T>::IsEmpty( ) const
{
    return (fifo__[0].empty( ) && fifo__[1].empty( ));
}
template <class T>
inline
void
DelayQueue<T>::DecreaseDelay( )
{
    int diff = newDelay__? delayInterval__- newDelay__/audioFrameInterval__- 1 :
                            delayInterval__;
    // Dummy read from Queues to get to the right delay position
    for( int i=0; i<diff; ++i ) {
        if( !fifo__[1].empty( ) ) {
            fifo__[1].pop( );
        }
        if( !fifo__[0].empty( ) ) {
            fifo__[0].pop( );
        }
    }
}
template <class T>
inline
int
DelayQueue<T>::GetDelay     ( ) const
{
    return delayInterval__*audioFrameInterval__;
}
#endif
```

The invention claimed is:

1. A method of adaptively time-shifting an encoded audio signal relative to an encoded video signal in a received audio/video message stream such that a corresponding decoded audio signal and a corresponding decoded video signal are aligned in time within a maximum degree of deviation ($\Delta_{max}$),
the encoded audio signal being divided into audio frames ($F_a$) having a first frame interval ($T_a$),
the encoded video signal being divided into video frames ($F_v$) having a second frame interval ($T_v$),
determining a desired delay ($D_d$) of the encoded audio signal for the corresponding decoded audio and video signals to be aligned in time within the maximum degree of deviation ($\Delta_{max}$), the method characterised by the steps of:
calculating a frame delay number ($n_D$) as one of the two neighbouring integers to a ratio between the desired delay ($D_d$) and the first frame interval ($T_a$),
storing sequentially a number of audio frames ($F_a(1)$-$F_a(5)$) equal to the frame delay number ($n_D$) before decoding a matching video frame ($F_v(1)$),
decoding the matching video frame ($F_v(1)$),
decoding the stored audio frames ($F_a(1)$-$F_a(5)$) in the sequential order of storage, and
repeating the above steps for remaining audio frames (($F_a(6)$-$F_a(k)$)) respective video frames ($F_v(2)$-$F_v(m)$) of the audio/video message stream.

2. A method according to claim 1, characterised by the frame delay number ($n_D$) being equal to the integer part of the ratio between the desired delay ($D_d$) and the first frame interval ($T_a$).

3. A method according to claim 1, characterised by the frame delay number ($n_D$) being equal to the integer part of the ratio between the desired delay ($D_d$) and the first frame interval ($T_a$) plus one.

4. A method according to any of the preceding claims, characterised by the audio/video message stream being received under a transport protocol which provides support for timing reconstruction.

5. A method according to claim 4, characterised by each audio frame ($F_a$) and each video frame ($F_v$) being allocated a timestamp indicative of a point in time when a particular frame ($F_a$; $F_v$) was created.

6. A method according to claim 5, characterised by the desired delay ($D_d$) being determined from the timestamps allocated to the audio frames ($F_a$) and the video frames ($F_v$) respectively in the received audio/video message stream.

7. A computer program directly loadable into the internal memory of a computer, comprising software for performing the steps of claim 1 when said program is run on the computer.

8. A computer readable medium, having a program recorded thereon, wherein the program causes a computer to perform the steps of claim 1.

9. An apparatus for adaptively time-shifting an encoded audio signal relative to an encoded video signal in a received audio/video message stream such that a corresponding decoded audio signal respective decoded video signal are aligned in time within a maximum degree of deviation, the encoded audio signal being divided into audio frames ($F_a$) having a first frame interval ($T_a$), the encoded video signal being divided into video frames ($F_v$) having a second frame interval ($T_v$), the apparatus characterised in that it comprises
a first buffer (309) sequentially storing received audio frames ($F_a$),
a second buffer (310) sequentially storing received audio frames ($F_a$), and
a controller (312)
storing a first frame interval value ($T_a$) representing a time span between two consecutively generated audio frames ($T_a$),
deriving and storing a desired delay value ($D_d$) from timing indications ($ts_a$, $ts_v$) of the received audio frames ($F_a$) and the received video frames ($F_v$) in the received audio/video message stream, the desired delay value ($D_d$) indicating a necessary delay of the audio frames ($F_a$) for the decoded audio and video signals to be aligned in time within the maximum degree of deviation,
calculating a frame delay number ($n_D$) as one of the two neighbouring integers to a ratio between the desired delay value ($D_d$) and the first frame interval value ($T_a$), and
controlling an alternate storage of delay number ($n_D$) audio frames ($F_a$) into the first buffer (309) during read-out of delay number ($n_D$) audio frames ($F_a$) from the second buffer (309) respective storage of delay number ($n_D$) audio frames ($F_a$) into the second buffer (310) during read-out of delay number ($n_D$) audio frames ($F_a$) from the first buffer (309).

10. An apparatus according to claim 9, characterised in that it comprises a first buffer switch (B) and a second buffer switch (C),
the controller (312) controlling the first buffer switch (B) to alternately store audio frames ($F_a$) into the first buffer (309) or into the second buffer (310), and
the controller (312) controlling the second buffer switch (C) to alternately read out audio frames from the first buffer (309) or from the second buffer (310).

11. An apparatus according to any of the claims 9 or 10, characterised in that it comprises a first delay switch (A) and a second delay switch (D),
the controller (312) controlling the first delay switch (A) to alternately add a delay to the received audio signal by feeding its corresponding audio frames ($F_a$) through the buffers (309; 310) or forward its corresponding audio frames ($F_a$) without additional delay, and
the controller (312) controlling the second delay switch (D) to alternately read out delayed audio frames ($F_a$) from the buffers (309; 310) or non-delayed audio frames ($F_a$) via the first delay switch (A).

12. An apparatus according to claim 11, characterised in that it comprises a de-multiplexer (307), the de-multiplexer (307)
receiving the audio/video message stream and separating it into audio frames ($F_a$) respective video frames ($F_v$),
arranging the audio frames ($F_a$) and the video frames ($F_v$) in a time sequential order based on a timing indication ($ts_a$) allocated to each frame, and
forwarding audio frames ($F_a$) and timing indications ($ts_a$, $ts_v$) of the audio frames ($F_a$) and the video frames ($F_v$) to the controller (312).

13. An apparatus according to claim 12, characterised in that it comprises an input data forming unit (308) and an output data delivery unit (311),
the input data forming unit (308) receiving audio frames ($F_a$) to be delayed from the de-multiplexer (307) and arranging such frames according to a data structure which is suitable for sequential storage in a delay buffer, and
the output data delivery unit (311) re-arranging delayed audio frames ($F_a$) according to a data structure which is suitable for decoding and delivering the frames for subsequent decoding into a decoded audio signal.

14. A system for transmission of real-time audio and video information from a transmitter station to a receiver station via a transmission medium (306), the transmitter station comprising an audio encoding unit (303) encoding audio information into audio frames ($F_a$), a video encoding unit (304) encoding video information into video frames ($F_v$) and a multiplexer combining the audio frames ($F_a$) and the video frames ($F_v$) to an audio/video message stream to be sent through the transmission medium (306), and the receiver station comprising an apparatus according to claim 9, an audio decoding unit (313) extracting an audio signal from received audio frames ($F_a$) and a video decoding unit (315) extracting a video signal from received video frames ($F_v$).

15. A system according to claim 14, characterised in that the transmitter station comprises a microphone (301) registering acoustic data and forwarding an audio signal to the audio encoding unit (303), and a video camera (302) registering image data and forwarding a video signal to the video encoding unit (304), and the receiver station comprises a loudspeaker (314) receiving an audio signal from the audio decoding unit (313) and delivering a corresponding acoustic signal, and a video monitor (316) receiving a video signal from the video decoding unit (315) and presenting a corresponding image signal.

* * * * *

UNITED STATES PATENT AND TRADEMARK OFFICE
CERTIFICATE OF CORRECTION

PATENT NO. : 7,295,247 B2 Page 1 of 1
APPLICATION NO. : 10/344490
DATED : November 13, 2007
INVENTOR(S) : Bang It is certified that error appears in the above-identified patent and that said Letters Patent is hereby corrected as shown below:

Drawings In Fig. 1A, Sheet 1 of 4, delete " $F_a(1;)$ " and insert -- $F_a(1)$ --, therefor.

Drawings In Fig. 1A, Sheet 1 of 4, delete " $F_v(14)$ " and insert -- $F_a(14)$ --, therefor.

Drawings In Fig. 1D, Sheet 1 of 4, delete " $F_v(5)$ " and insert -- $F_a(5)$ --, therefor.

Drawings In Fig. 1D, Sheet 1 of 4, delete " $F_v(6)$ " and insert -- $F_a(6)$ --, therefor.

Drawings In Fig. 1D, Sheet 1 of 4, delete " $F_v(9)$ " and insert -- $F_a(9)$ --, therefor.

In Column 1, Line 39, delete "kpbs" and insert -- kbps --, therefor.

In Column 1, Line 45, delete "kpbs" and insert -- kbps --, therefor.

In Column 4, Line 55, delete " $F_a(^1)$-$F_a(^{14})$ " and insert -- $F_a(1)$-$F_a(14)$ --, therefor.

Signed and Sealed this

Thirty-first Day of March, 2009

JOHN DOLL
*Acting Director of the United States Patent and Trademark Office*